Patented Sept. 14, 1954

2,689,238

UNITED STATES PATENT OFFICE 2,689,238

POLYMERIZABLE AND POLYMERIZED COMPOSITIONS PRODUCED FROM A POLYMER OF AN UNSATURATED GUANAMINE

Walter M. Thomas, Springdale, Conn., assignor to American Cyanamid Company, New York, N. Y., a corporation of Maine No Drawing. Application July 18, 1952,
Serial No. 299,745

14 Claims. (Cl. 260—45.2)

This invention relates to the production of new materials having valuable and characteristic properties that make them especially suitable for use in industry, for example in molding, coating, laminating, adhesive, textile-treating, paper-treating and other applications. More particularly the invention is concerned with polymerizable compositions comprising a polymerizable product of reaction of ingredients comprising (1) a polymer (i. e., a homopolymer or a copolymer) of an amidogen compound represented by the general formula I 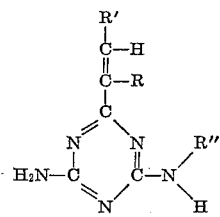

where R represents a member of the class consisting of hydrogen and the methyl radical, R' represents a member of the class consisting of hydrogen and the phenyl radical, and R'' represents a member of the class consisting of hydrogen and alkyl, aralkyl and aryl radicals, and (2) a substance which is reactive with the polymer of (1) and which is selected from the class consisting of (a) aldehydes (including compounds engendering an aldehyde), e. g., formaldehyde, paraformaldehyde (polyoxymethylene), glyoxal, furfural, acrolein, glycollic aldehyde, etc., (b) reaction products of ingredients comprising an aldehyde and a carbon-containing amidogen compound and (c) mixtures of (a) and (b). The scope of the invention includes polymerization products of the aforementioned polymerizable compositions, as well as method features.

Illustrative examples of radicals represented by R'' in Formula I are alkyl (including cycloalkyl), e. g., methyl to octadecyl, inclusive, and the various isomeric forms thereof, cyclopentyl, cyclohexyl, cycloheptyl, etc.; aralkyl, e. g., benzyl, phenylethyl, phenylpropyl, etc.; and aryl (including alkaryl), e. g., phenyl, diphenyl, biphenylyl or xenyl, tolyl, xylyl, ethylphenyl, etc. When R'' is an aryl or aralkyl radical, the guanamine is more compatible with, or soluble in, an unsaturated alkyd resin and more readily forms a copolymer therewith.

Illustrative examples of amidogen compounds, more particularly unsaturated guanamines, embraced by Formula I are acryloguanamine, methacryloguanamine, cinnamoguanamine, and N-phenylmethacryloguanamine. Other examples will be apparent to those skilled in the art from Formula I and the definitions of R, R' and R'' and from the numerous illustrative examples, hereinbefore given, of alkyl, aralkyl and aryl radicals represented by R'' in the said formula.

The unsaturated guanamines used in carrying the present invention into effect are prepared by known methods, for example as disclosed and claimed in Patent No. 2,461,943, dated February 15, 1949. In general, these alpha,beta-unsaturated guanamines are produced by effecting reaction between biguanide or a 1-substituted biguanide and an ester of an alpha,beta-unsaturated aliphatic carboxylic acid.

The term "amidogen compound" as used generally herein and in the appended claims has reference to an aldehyde-reactable amino or amido compound, and more particularly to such a compound which contains at least one (e. g., one, two, three, four, five or any higher number) amidogen (amino or amido) grouping having at least one hydrogen atom attached to the amidogen nitrogen atom. In most cases the amidogen compound referred to under (b) is a monomeric, carbon-containing amidogen compound having from one to four or five (preferably two or three) amidogen groupings in its molecule. Urea and melamine are typical examples of such amidogen compounds. If desired, the amidogen compound referred to under (b) can be an unsaturated guanamine of the kind embraced by Formula I.

It was known prior to my invention that resinous compositions could be prepared by effecting reaction between ingredients including (1) an aldehyde and (2) an aminotriazine having an unsaturated grouping, specifically an alloxy (allyloxy) radical, attached to a carbon atom in the triazine ring. Examples of such aminotriazines are 2-alloxy-4,6-diamino-1,3,5-triazine and 2-amino-4,6-dialloxy-1,3,5-triazine, and the aldehyde-reaction products of which are more fully described in, for example Kropa Patent No.

2,496,097. It is also disclosed in this Kropa patent that the reaction between the aldehydic reactant and the monomeric triazine derivative may be carried out so that both polymerization and condensation take place substantially simultaneously; and that this may be accomplished, for example, by heating the mixed reactants in the absence of a polymerization inhibitor, but in the presence of a catalyst capable of functioning both as a condensation catalyst and a polymerization catalyst, or in the presence of both a condensation catalyst and a polymerization catalyst. Resinous materials of the kind disclosed in the aforesaid Kropa Patent No. 2,496,097 are valuable for many industrial and other applications but their field of utility is somewhat limited because of the tendency of the unsaturated grouping to be sluggish in its rate of polymerization when it is desired to form homopolymers of the polymerizable aminotriazine (or of its aldehyde-reaction product) or copolymers thereof with other copolymerizable monomers.

Various classes of synthetic materials also were produced prior to my invention by effecting reaction between an aldehyde, e. g., formaldehyde, and an aldehyde-reactable polymer. For example, Schaefer Patent No. 2,481,155 discloses resins produced by effecting reaction between formaldehyde or other aldehyde and a linear polymer resulting from a transesterification reaction between a certain kind of an aminotriazine, e. g., 2-amino-4,6-dialloxy-1,3,5-triazine, and a certain kind of a dihydric alcohol, e. g., diethylene glycol. Also, in Wohnsiedler and Kropa Patent No. 2,584,177 there are disclosed resinous materials produced by effecting reaction between an aldehyde, specifically formaldehyde, and a linear polymer obtained by reaction between epsilon-caprolactam and ammonia or certain amines. The resinous materials obtained by Schaefer and by Wohnsiedler et al., and which are described in the aforementioned patents, are different in their chemical constitution and in their specific properties from each other and from those disclosed and claimed in this application, and none is the equivalent of the other.

It was also known prior to my invention that melamine resins, e. g., the butylated melamine-formaldehyde resins, will give hard and solvent-resistant coatings but these coatings are deficient in properties such, for example, as adhesion and flexibility. It was further known that various polymers, more particularly thermoplastic polymers, have valuable properties such as good clarity, adhesion, flexibility, etc., and that these properties can be varied by making suitable copolymers, e. g., copolymers with styrene. However, these copolymers ordinarily exhibit undesirable flow characteristics and softness or tackiness at moderate or at elevated temperatures; also, they usually lack resistance to common organic solvents. To attempt to overcome these deficient properties in the aforementioned materials individually, the logical approach has been to attempt to blend the melamine resins with various thermoplastic resins, including various thermoplastic resinous homopolymers and copolymers. Such attempts have been generally unsatisfactory in that the cured, blended product is hazy or opaque, and is lacking in the desired solvent resistance. The melamine resins and most thermoplastic polymers and copolymers are, in general, incompatible with each other and do not provide a blended product which has combined therein the good properties that are required.

The present invention is based on my discovery that the difficulties described in the preceding paragraph can be obviated, and that a new class of synthetic materials having particular and peculiar properties that make them especially valuable for use in industry can be prepared, as is briefly described in the first paragraph of this specification and more fully hereinafter. In comparison with other compounds containing both polymerizable, ethylenically unsaturated groups and aldehyde-reactive groups, the unsaturated guanamines embraced by Formula I have certain particular and peculiar advantages that are inherent in their structure, and these advantages are carried through into their polymers and copolymers and into the aldehyde-reaction products thereof. As opposed to the usual allyl compounds, including allyloxy aminotriazines, and as has been indicated hereinbefore, the unsaturated guanamines within the scope of Formula I can be caused to polymerize rapidly, either alone or with other unsaturated materials that are copolymerizable therewith, to form high-molecular-weight products. Both the ethylenic group and the amidogen group are linked directly to the very stable triazine nucleus, and, as a result, these guanamine compounds are much less susceptible to acid or alkaline hydrolysis than are the more common unsaturated, aldehyde-reactable compounds, e. g., methacrylamide, which may lose one or both functions (i. e., ability to polymerize and aldehyde-reactivity). Furthermore, in the case of unsaturated guanamines of the kind embraced by Formula I there is no possibility (because of their method of preparation) that they will contain impurities having more than one polymerizable ethylenic group; hence they can be polymerized to form polymers that are entirely free from fortuitous cross-links between polymer chains. Such impurities in many of the other aldehyde-reactable unsaturated materials heretofore suggested as resin-forming intermediates sometimes lead to premature gelation or insolubility of the product.

Another advantage flowing from my invention results from the fact that polymers of the unsaturated guanamines embraced by Formula I have excellent color stability, especially as compared with compounds in which methylol groups are introduced through the agency of aliphatic amino or phenolic functions. When R" in Formula I represents hydrogen, up to four methylol groups per triazine nucleus may be caused to react with the polymer of the unsaturated guanamine, with practical advantages that immediately will be apparent to those skilled in the art, since merely by varying the proportion of aldehyde to the polymeric guanamine reactant, a wide variation in the properties of the final resin can be obtained. Still another advantage resides in the fact that the guanamines embraced by Formula I and their polymers, and alkylol (specifically methylol) derivatives of such guanamines and polymers thereof, have a weakly basic structure and, therefore, can form acid salts having enhanced solubility or dispersibility characteristics. These properties are particularly useful in certain applications, e. g., those involving the use of colloidal solutions or dispersions wherein positive electrical charges are carried by the colloidal particles of the resin (reference: Wohnsiedler and Thomas Patent No. 2,356,718).

In practicing my invention the initial reaction between the aldehydic reactant and the polymer (homopolymer or copolymer) of the unsaturated guanamine may be carried out at normal or at an elevated temperature, at atmospheric, subatmospheric or superatmospheric pressure, and under neutral, alkaline or acid conditions. Any substance yielding an alkaline or an acid aqueous solution may be used in obtaining alkaline or acid conditions for the initial condensation reaction. For example, I may use an alkaline substance such as sodium, potassium or calcium hydroxide, sodium or potassimum carbonate, a mono-, di- or triamine, etc. Illustrative examples of acid condensation catalysts that may be employed in catalytic amounts are inorganic and organic acids, e. g., hydrochloric, sulfuric, phosphoric, formic (which is normally present in the aqueous formaldehyde employed), acetic, lactic, acrylic, phthalic, maleic, etc., or acid salts such as sodium acid sulfate, monosodium phosphate, monosodium phthalate, etc. If desired, mixtures of acids, of acid salts or of acids and acid salts may be employed in catalytic amounts in order to obtain acid conditions for the initial reaction. Acid-addition salts of the polymer of the unsaturated guanamine can be used instead of the latter itself as a starting reactant with the aldehydic component or reactant (i. e., an aldehyde or a reaction product of ingredients comprising an aldehyde and a carbon-containing amidogen compound or a mixture of the two in any proportions).

The reaction between the aldehydic reactant, e. g., formaldehyde, a butylated melamine-formaldehyde partial reaction product, a methylol (e. g., monomethylol or dimethylol) methacryloguanamine, dimethylol urea, trimethylol melamine, etc., and the polymer of the unsaturated guanamine can be carried out in the presence of solvents or diluents, other natural or synthetic bodies (numerous examples of which hereafter are given), or while admixed with other materials which are reactable or non-reactable with the aldehydic reactant or with the aforementioned polymer, e. g., urea, thiourea, cyanamide, dicyandiamide, phthalic diamide, acetamide, chlorinated acetamides, methyl ethyl ketone, etc.; aldehyde-reactable triazinyl substances other than the polymers used in practicing the present invention, e. g., melamine, ammeline, ammelide, etc.; phenol and substituted phenols, e. g., the cresols, the xylenols, the tertiary-alkyl phenols, etc.; monohydric and polyhydric alcohols, e. g., butyl alcohol, amyl alcohol, heptyl alcohol, n-octyl alcohol, 2-ethylhexyl alcohol, ethylene glycol, propylene glycol, glycerine, polyvinyl alcohol, etc.; amines, including aromatic and aliphatic amines, e. g., aniline, tributylamine, diamylamine, etc.; and the like.

The modifying reactants may be incorporated with the polymer of the unsaturated guanamine and the aldehydic reactant to form an inter-reaction product by mixing all the reactants and effecting reaction therebetween under acid, alkaline or neutral conditions or by various permutations of reactants. For example, I may effect partial reaction or, more particularly, condensation between the chosen aldehydic reactant and the polymer, then add the modifying reactant, e. g., urea, melamine, etc., and effect further reaction. Or, I may first partially react urea, melamine or other aldehyde-reactable modifying reactant with a molecular excess of an aldehyde under acid, alkaline or neutral conditions, then add the polymer and effect further reaction. Or, I may separately partially react (1) urea, melamine or other aldehyde-reactable modifying reactant and an aldehyde and (2) a polymer of an unsaturated guanamine of the kind used in practicing the present invention and an aldehyde, thereafter mixing the two products of partial reaction and effecting further reaction therebetween. The reactants of (1) and (2) initially may be partially reacted under acid, alkaline or neutral conditions.

In producing the reaction products of the present invention the choice of the aldehydic reactant is dependent upon such influencing factors as, for example, economic considerations and the particular properties desired in the finished product. The aldehydic reactant can be an aldehyde (or a compound engendering an aldehyde), or a reactive (i. e., reactive with the polymer of the unsaturated guanamine) reaction product of ingredients comprising an aldehyde and a carbon-containing amidogen compound, or a mixture of an aldehyde (or a compound engendering an aldehyde) and the aforementioned aldehyde-reaction product in any proportions. As an aldehyde reactant can be used such aldehydes as, for example, formaldehyde or compounds engendering formaldehyde, e. g., paraformaldehyde, hexamethylene tetramine, etc. Illustrative examples of other aldehydes that may be employed are acetaldehyde, propionaldehyde, butyraldehyde, heptaldehyde, octaldehyde, methacrolein, crotonaldehyde, benzaldehyde, furfural, hydroxyaldehydes (e. g., aldo, glucose, glycollic aldehyde, glyceraldehyde, etc.), mixtures thereof, or mixtures of formaldehyde (or compounds engendering formaldehyde with such aldehydes.

Alternatively, instead of an aldehyde itself, the aldehydic reactant can be a reactive reaction product of ingredients comprising an aldehyde, e. g., formaldehyde or other aldehyde (numerous examples of which have just been given), and a carbon-containing amidogen compound which is reactive with an aldehyde. Examples of such reaction products are aldehyde-addition products, e. g., the mono- and poly-(N-carbinol) derivatives, more particularly the mono- and poly-methylol derivatives, of urea, thiourea and iminourea, and of substituted ureas, thioureas and iminoureas, mono-, di- and tri-(N-carbinol) derivatives of acryloguanamine, methacryloguanamine, cinnamoguanamine, N - phenyl-methacryloguanamine and of other guanamines containing an unsubstituted or a saturated or unsaturated substituent in the 2-position, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of ammelide, ammeline, melamine, the aminotriazoles and the aminodiazines.

Examples of other amidogen compounds that can be reacted with an aldehyde to form an aldehyde-addition product or a partial condensation product that is reactive with the polymer of the unsaturated guanamine are carbon-containing nitrogenous compounds containing a radical represented by the formula II 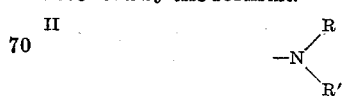

where R represents a member of the class consisting of hydrogen and, for example, hydroxy-hydrocarbon radicals and R' represents a member of the class consisting of hydrogen and, for instance, hydrocarbon radicals and hydroxy-hydrocarbon radicals. More specific examples of such amidogen compounds are:

Butylamine (monobutylamine)
2-amino-4-methylpentane
Di-n-amylamine
Decylamine
Dioctadecylamine
Ethylenediamine
1,3-diaminopropane
1,7-diaminoheptane
Diethylenetriamine
Diethanolamine
Hydroxyethyl ethylenediamine
Monoisopropanolamine
Bis(4-aminobutyl) ether
Bis(6-aminohexyl) ether
o-, m- and p-Phenylenediamines
Aminoguanidine
Guanidine
1,1-dimethylhydrazine
Semicarbazide
Aniline
o-, m- and p-Toluidines
4-amino-2-butanol Other examples will be found in, for instance, Kropa et al. Patent No. 2,582,594 (column 16, line 50, through line 24, column 19) and wherein numerous operative carbon-containing amidogen compounds suitable for use in practicing the present invention are generically described, including descriptions of various broad classes, and specific examples (in addition to those named above) are given. Similar generic and specific examples also are given in Schaefer et al. Patent No. 2,545,049 (column 14, line 18, through line 19, column 16).

The ratio of the aldehydic reactant to the polymer (homopolymer or copolymer) may be varied as desired or as conditions may require, the proportions depending upon such influencing factors as, for instance, the particular polymer of the unsaturated guanamine and aldehydic reactant employed and the particular properties desired in the finished product. If the aldehydic reactant is an aldehyde, e. g., formaldehyde, it is used in an amount sufficient to react with at least one of the reactive amino groups in the polymer, more particularly from one to all of the aforesaid reactive amino groups. Ordinarily the aldehydic reactant is employed in an amount such that at least 1% of the hydrogen atoms attached to the amino nitrogen atom of the guanamine polymer are replaced either by alkylol (specifically methylol) groups or by dehydration products thereof. Thus I may use, for example, from 0.5 to 4 moles of the aldehyde for each aldehyde-reactable recurring guanamine unit in the polymer.

When the aldehyde is available for reaction in the form of an alkylol derivative, more particularly a methylol derivative, e. g., dimethylol urea, trimethylol melamine, etc., amounts of such alkylol derivatives corresponding to or higher (e. g., from a few percent more to 15 to 20 times as much) than the relative amounts mentioned above with reference to the aldehyde may be used. When the aldehydic reactant is a reactive product of reaction of ingredients comprising an aldehyde and an amidogen compound that has been reacted beyond the alkylol stage, but is still capable of co-reacting with the polymer of the unsaturated guanamine, then the proportions thereof with respect to the said polymer may be either more or less than those proportions just mentioned with respect to the use of an aldehyde or an alkylol derivative as the aldehydic reactant. Depending upon the particular starting reactants employed and the particular properties desired in the finished product, the weight proportions of reactants (i. e., aldehydic reactant and polymeric or copolymeric guanamine) can range, as desired or as conditions may require, from 1:99 to 99:1, more particularly from 10:90 to 90:10, bearing in mind that when the aldehydic reactant is an ordinary aldehyde the proportions are usually of the order of those given in the preceding paragraph.

The reaction between the aldehydic reactant and the polymer of the unsaturated guanamine can be effected under a wide range of pH conditions, as has been indicated hereinbefore, for example a pH of from about 1 or 2 to about 11, and more specifically a pH of from about 6 to about 9.

Any suitable temperature can be employed for effecting reaction between the polymer of the unsaturated guanamine and the aldehydic reactant. In some cases the reaction can be initiated at room temperature (20°–30° C.). Ordinarily, the temperature of the reaction varies between about 60° C. and the reflux temperature of the reaction mass when the reaction is carried out at atmospheric pressure in the presence of a solvent or diluent, or at or approaching the fusion point if the reaction mixture is a solid at normal room temperature. If the reaction be carried out at pressures above atmospheric, temperatures as high as, for example, 200°–225° C. or even higher may be employed.

As has been indicated hereinbefore, the polymer of the unsaturated guanamine which is used as a starting reactant can be a homopolymer, or it can be a copolymer of the unsaturated guanamine with any other unsaturated material that is copolymerizable therewith and in any proportions. This polymer of the unsaturated guanamine can be of any desired molecular weight, for example an average molecular weight ranging between about 1,000 and about 1,000,000 as determined by viscosity measurements using the Staudinger equation. The unsaturated material can be a compound containing a $CH_2=C<$ grouping which is copolymerizable with the unsaturated guanamine, e. g., styrene, methyl acrylate, methyl methacrylate, diallyl phthalate and others such as are mentioned by way of illustration in the copending application of John J. Padbury and John A. Price, Serial No. 299,728, filed concurrently herewith.

Other examples of copolymerizable substances that can be copolymerized with the unsaturated guanamine to form a copolymer containing a reactive amino group include the polymerizable unsaturated alkyd resins (modified or unmodified), e. g., ethylene glycol maleate, diethylene glycol maleate phthalate, ethylene glycol maleate succinate and diethylene glycol maleate linoleate. As will be understood by those skilled in the art, the unsaturated alkyd resin and guanamine are chosen from those which are compatible and copolymerizable with each other. Other and more specific examples of unsaturated alkyd resins that can be used are given, for example, in Nyquist and Kropa Patent No. 2,503,209, dated April 4, 1950, and patents referred to therein (see, for instance, column 8, lines 1–64). The unsaturated alkyd resins contain a plurality of polymerizably reactive alpha, beta-enal groups,

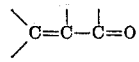

and are prepared in accordance with technique well known to those skilled in the resin art.

Other examples of compounds that can be copolymerized with the unsaturated guanamines embraced by Formula I to form a starting reactant for use in carrying the present invention into effect are given in Kropa Patent No. 2,510,503 (e. g., column 2, line 46, to the end of the sentence in line 16, column 3; column 5, line 54, through line 46, column 7; and column 13; line 42, through line 30, column 16); and in the aforesaid Nyquist et al. Patent No. 2,503,209 (see, for instance, column 5, line 67, through line 75, column 7; and column 9, line 74, through line 12, column 11).

Mixtures of different compounds containing a $CH_2=C<$ grouping, or mixtures of different unsaturated alkyd resins, or mixtures of a compound containing a $CH_2=C<$ grouping and an unsaturated alkyd resin can be used as the unsaturated material in forming a copolymer of the unsaturated guanamine.

The proportions of the polymerizable materials that are employed in forming the copolymer may be varied as desired or as conditions may require, e. g., within weight proportions of 1:99 to 99:1, more particularly from 10:90 to 90:10. Thus, the unsaturated guanamine may constitute as little as 1 or 2% by weight of the mixture of comonomers to as much as 98 or 99% by weight of the said mixture; or, if desired, a homopolymer of the unsaturated guanamine can be employed.

The homopolymers and copolymers used in practicing the present invention can be produced by any suitable means, for instance as described in the aforementioned Kropa and Nyquist patents and in my copending application Serial No. 299,746, filed concurrently herewith, with particular reference to the production of polymers and copolymers of aldehyde-reaction products of unsaturated guanamines of the kind embraced by Formula I.

In order that those skilled in the art may better understand how the present invention can be carried into effect, the following examples are given by way of illustration and not by way of limitation. All parts and percentages are by weight.

*Example 1*

A copolymer of acryloguanamine and 2-hydroxyethyl methacrylate is prepared by charging 2 g. of acryloguanamine, 98 g. of 2-hydroxyethyl methacrylate and 850 ml. of deionized water to a reaction vessel, and heating the mixture therein on a steam bath until a clear solution has formed. A solution of 0.5 g. of ammonium persulfate, $(NH_4)_2S_2O_8$, in 50 ml. of water is added, and the solution is stirred for 2 hours under a condenser while continuing the heating on the steam bath. Without isolating the resulting copolymer, the product comprising a clear solution with a trace of gel is divided into two equal portions. To one is added 2.4 ml. formalin (approximately 37% $CH_2O$) and to the other 4.6 ml. aqueous glyoxal

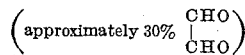

which is in the ratio of about 4 moles of aldehyde per mole of starting acryloguanamine in each case. The resulting solutions are allowed to stand at room temperature (20°–30° C.) for about 16 hours, yielding clear solutions of the aldehyde-reaction products of the copolymer. Sheets of filter paper are impregnated with these solutions. The impregnated sheets are air-dried and then cured by heating for 10 minutes at 105° C., after which they are soaked in water for 5 minutes and then tested for wet strength. The results are as follows:

| Treatment | Percent Copolymer in Sheet | Wet Strength |
| --- | --- | --- |
| None | None | None. |
| Treated with formaldehyde reaction product of copolymer. | 6.5 | Fair. |
| Treated with glyoxal-reaction product of copolymer. | 7.9 | Good. |

*Example 2*

A clear solution is produced by stirring a mixture of the following ingredients in a reaction vessel placed on a steam bath:

99 g. methacryloguanamine
1 g. acrylamide
130 ml. 6 N $H_2SO_4$
5000 ml. water

To the clear solution is added a solution of 1 g. of ammonium persulfate, $(NH_4)_2S_2O_8$, in 100 ml. deionized water, whereupon a white precipitate of copolymer of methacryloguanamine and acrylamide begins to form. After heating and stirring for 80 minutes, the resulting slurry is cooled and then treated with about 1500 ml. of N/2 NaOH, bringing the pH of the slurry to 8. The copolymer is isolated by filtration, washed with 1500 ml. water and then with ethanol, after which it is dried for 18 hours at 70° C. A portion of the dry copolymer is reacted with an aldehyde, specifically formaldehyde, as described below:

16 g. above methacryloguanamine-acrylamide copolymer
32 g. formalin (approx. 37% $CH_2O$)
5 ml. triethanolamine
50 ml. water are heated together under reflux in a reaction vessel placed on an oil bath. The mixture passes rapidly (in about 5 minutes) from a slurry to a clear syrup and thence to a soft gel. It is transferred to a shallow vessel and heated therein for 1 hour at 115° C., forming a hard, continuous, insoluble resinous film. The product does not fuse at 155° C. under pressure.

*Example 3*

A dry blend is made by pulverizing together 16 parts of the dry methacryloguanamine-acrylamide copolymer of Example 2 and 24 parts of a dry melamine-formaldehyde partial reaction product comprising mainly dimethylol melamine. The resulting molding composition is molded in the form of a 2-inch disc by pressing at 155° C. as follows:

1 minute preheat at contact pressure
1 minute at 1 ton total pressure
1 minute at 2 tons' total pressure
2 minutes at 4 tons' total pressure During the period of heating and molding, reaction takes place between the aforesaid copolymer and the melamine-formaldehyde partial reaction product. The molded article is hard, translucent and well-cured.

*Example 4*

A mixture is made of equal parts of (a) an aqueous, syrupy reaction product comprising mainly trimethylol methacryloguanamine and containing about 78.5% of solids and (b) a 25% solution of a copolymer of 20 parts acryloguanamine and 80 parts butyl acrylate. The copolymer of (b) is dissolved in a solvent comprising the monomethyl ether of ethylene glycol plus a small amount of water and ethanol.

A film of the above composition is cast on glass, air-dried and then dried for ½ hour at 115° C. During this drying period, reaction takes place between the aforesaid copolymer and reaction product. The baked film is clear, slightly tacky and resistant to toluene. In marked contrast, a film cast from a solution of the copolymer alone yields a baked coating which is much more rubbery and has no resistance to toluene.

*Example 5*

A

A copolymer of methacryloguanamine, styrene and butyl acrylate is prepared by heating a mixture of the following ingredients for 6 hours under reflux:

| | Parts |
|---|---|
| Methacryloguanamine | 20 |
| Styrene | 40 |
| Butyl acrylate | 40 |
| Monomethyl ether of ethylene glycol | 200 |
| Cumene hydroperoxide | 1 |

B

Same as in A with the exception that 20 parts of N-phenylmethacryloguanamine is substituted for 20 parts of methacryloguanamine.

The solutions of the copolymers of A and B are clear, viscous syrups that give hard, clear films on drying. However, the dried films lack solvent resistance.

Blends are made of each of the above copolymer syrups and a butylated melamine-formaldehyde reaction product (55% solids) so that each blend contains copolymer and butylated melamine-formaldehyde reaction product in the ratio, based on solids contents, of 4 parts of the former to 1 part of the latter. Reaction conditions and the appearance, xylene resistance and other properties of films cast on glass and baked for 30 minutes at 125°–130° C. are given below:

| Copolymer | Treatment Prior to Casting Films | Baked Film |
|---|---|---|
| A | None | Hard, opaque, resistant to xylene. |
| A | Reflux 30 min | Do. |
| A | Reflux 15 min., cool, then add 0.5% H₃PO₄. | Hard, clear, good xylene resistance. |
| B | do | Hard, slightly hazy, fair xylene resistance. |

In all cases the products prior to being cast as films are clear, viscous compositions. A comparison of the results of the first two tests indicates that refluxing the solution, prior to film casting, does not effect much, if any, additional co-reaction between the copolymer and the butylated melamine-formaldehyde reaction product over and beyond that which takes place during the baking of a cast film at 125°–130° C.

When a blend is similarly made using a copolymer of 50% styrene and 50% butyl acrylate instead of copolymers A and B and a 50:50 mixture of butanol and xylene is employed as a solvent since the monomethyl ether of ethylene glycol is a poor solvent for such a guanamine-free butyl acrylate-styrene copolymer, the resulting clear, viscous composition yields a baked film which is hard, cloudy and has poor resistance to xylene.

From the foregoing it will be seen that the advantages of using a polymer, more particularly a copolymer, of an unsaturated guanamine of the kind embraced by Formula I as a reactant with a reactive aldehyde-reaction product of an amidogen compound, specifically a reactive butylated melamine-formaldehyde resin, are of considerable practical significance and importance. The invention makes possible the production of baked films having greater solvent resistance than is provided by employing the usual homopolymers or copolymers as a modifier of an aminoplast resin. Furthermore, by introducing the specified unsaturated guanamine in the polymeric molecule, better compatibility is brought about between a thermoplastic resin, e. g., a thermoplastic vinyl resin, and a thermosetting aminoplast, more particularly a thermosetting amidogen-aldehyde resin, e. g., a butylated melamin-formaldehyde resin.

*Example 6*

Copolymers are prepared as in A and B of Example 5. To the syrupy ethylene glycol monomethyl ether solutions of each is added 8 parts of paraformaldehyde. After a 15-minute reflux period to effect reaction between the paraformaldehyde and the copolymer, the syrups are cooled, and 5 parts of 85% H₃PO₄ is added to each. The aldehyde-reaction product of the copolymer of A, when a film of a solution thereof is cast on glass and baked as in Example 5, gives a baked film which is hard, clear and xylene resistant; that from the aldehyde-reaction product of the copolymer of B is hard, hazy and fairly resistant to xylene.

*Example 7*

A copolymer of methacryloguanamine, styrene and butyl acrylate is prepared as described under A of Example 5. A blend is made of the resulting copolymer syrup and a butylated melamine-formaldehyde reaction product (55% solids) in the ratio, based on solids content, of 4 parts of the former to 1 part of the latter, the butylated melamine-formaldehyde reaction product being added to the hot ethylene glycol monomethyl ether solution of the copolymer. The blend is cooled at once, yielding a clear, viscous syrup. Fifty (50) parts of this syrup is blended with 50 parts of a previously prepared mixture of (a) a polymerizable unsaturated alkyd resin produced by reaction of 6 moles propylene glycol, 4 moles phthalic anhydride and 2 moles fumaric acid and (b) styrene in the ratio of 60% of the former to 40% of the latter. The blend is made by heating the mixed ingredients in a reaction vessel placed on a steam bath until a homogeneous solution has been produced. Thereafter, 2.5 parts of a polymerization catalyst, specifically methyl ethyl ketone hydroperoxide, is added, and heating on the steam bath (about 90° C.) is continued for about 20 minutes, yielding a solid co-reaction product of the aforementioned ingredients.

*Example 8*

A homopolymer of methacryloguanamine is prepared as follows:

To a reaction vessel is added a solution of 10 parts of methacryloguanamine, 3.7 parts of sulfuric acid, 500 parts of water and 0.2 part of ammonium persulfate. The solution is heated on a steam bath for 1 hour. The resulting precipitate comprising homopolymeric methacryloguanamine is collected on a Büchner funnel, washed with 1000 parts of water and dried in an oven at 70° C. for 2 hours. The dry homopolymer is white, and is obtained in a yield corresponding to 80% of the theoretical.

A portion of the dry homopolymer is reacted with an aldehyde, specifically formaldehyde, in exactly the same manner described under Example 2 with particular reference to the preparation of a formaldehyde-reaction product of a copolymer of methacryloguanamine and acrylamide. At the end of the reflux period, the formaldehyde-reaction product is transferred to a shallow vessel and heated therein for 1 hour at 115° C., forming a hard, continuous, insoluble resinous film.

*Example 9*

Example 2 is repeated but instead of using 32 g. of formalin there are used 28.8 g. of formalin and 6.4 g. of dimethylol urea. The resulting reaction product has properties which are very similar to those of the product of Example 2.

It will be understood, of course, by those skilled in the art that my invention is not limited to the specific ingredients named in the above illustrative examples nor to the particular proportions and conditions of reaction there given. Thus, instead of using the particular unsaturated material that is specified in certain of the examples in producing a copolymer with an unsaturated guanamine of the kind embraced by Formula I, I may use any other unsaturated material which is copolymerizable with the unsaturated guanamine, numerous examples of which have been given hereinbefore, in my copending application Serial No. 299,746 and in the aforementioned patents to which reference was made in the portion of the specification wherein examples were given of copolymerizable substances that could be copolymerized with the unsaturated guanamine to form a copolymer. Likewise, instead of using the particular aldehydes mentioned in certain of the individual examples, I may use any other aldehyde or mixtures thereof, numerous examples of which previously have been given. Formaldehyde is the preferred aldehyde.

It will be understood, too, that I am not limited to the use of the particular reactive reaction products of ingredients comprising the particular aldehyde and the particular carbon-containing amidogen compound given in certain of the examples, and that I may use any other reactive aldehyde-reaction product of a carbon-containing amidogen compound. The carbon-containing amidogen compound may be, for instance, urea, melamine, ammeline, ammelide or any of the others embraced by this term, numerous examples of which have been given given hereinbefore. Such reactive aldehyde-reaction products may be produced by reaction between an aldehyde and a carbon-containing amidogen compound as sole reactants, or the reaction between these ingredients may be carried out in the presence of various modifying reactants, e. g., a monohydric alcohol, a phenol or others, singly or a plurality thereof, many examples of which are given hereinafter, as well as in the portion of this specification prior to the examples.

Various catalysts may be added to accelerate the cure of the reactive aldehyde-reaction product of the polymer of the guanamine, as desired or as conditions may require, among which may be mentioned for illustrative purposes acid or direct catalysts, for instance citric acid, phthalic anhydride, benzoic acid, salicylic acid, oxalic acid, etc.; latent curing catalysts (catalysts possessing latent acidity), e. g., ammonium chloride, monochloroacetyl urea, monochloroacetamide, o-sulfamidomethylbenzoate, etc.; as well as others. Good cures are usually obtained at a resin pH of about 3 to 6.

Other variations in the reaction procedures and conditions will be apparent from the foregoing description and from the examples that were given solely by way of illustration and which are not to be construed as limiting the scope of the invention.

As indicated hereinbefore and as further shown by some of the examples, the properties of the fundamental products, more particularly resinous or potentially resinous materials, of this invention can be varied widely by introducing other modifying bodies before, during or after effecting reaction (partial or substantially complete reaction) between the primary components. Thus, as modifying agents I may use, for instance, monohydric alcohols, e. g., methyl, ethyl, propyl, isopropyl, butyl, hexyl, n-octyl, 2-ethylhexyl, decyl, dodecyl, cetyl, lauryl, capryl or tetrahydrofurfuryl alcohol, pentanol or mixtures of isomeric pentanols (which mixtures also may include n-pentanol), cyclohexanol, methylcyclohexanol, etc.; polyhydric alcohols, e. g., glycerol, pentaerythritol, dipentaerythritol, mannitol, sorbitol, ethylene glycol, diethylene glycol, etc.; alcoholethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides, e. g., succinamide, malonic diamide, maleic diamide, fumaric diamide, stearamide, arylamide, benzamide, benzene sulfonamides, toluene sulfonamides, etc.; amines, e. g., ethylene diamine, phenylene diamine, triethylene tetramine, etc.; ketones, including halogenated ketones, e. g., methyl propyl ketone, acetone, chloroacetones, etc.; nitriles, including halogenated nitriles and unsaturated nitriles, e. g., acrylonitrile, methacrylonitrile, acetonitrile, chloroacetonitriles, etc.; acylated ureas, including halogenated acylated ureas, e. g., acetyl urea, propionyl urea, chloroacetyl ureas, etc.

Illustrative examples of other modifying bodies that may be incorporated into the resinous compositions of this invention include melamine-aldehyde condensation products (e. g., melamine-formaldehyde condensation products), urea-aldehyde condensation products (e. g., urea-formaldehyde condensation products), urea-melamine-aldehyde condensation products (e. g., urea - melamine - formaldehyde condensation products), protein-aldehyde condensation products, aminodiazine-aldehyde condensation products, aminotriazole-aldehyde condensation products, aniline-aldehyde condensation products, phenol-aldehyde condensation products (e. g., phenol-formaldehyde condensation products), furfural condensation products, modified or unmodified, saturated or unsaturated polyhydric alcohol-polycarboxylic acid reaction products, ester gums, water-soluble cellulose derivatives, natural gums and resins such as shellac, rosin, etc., polyvinyl compounds such as polyvinyl alcohol, polyvinyl esters (e. g., polyvinyl acetate, polyvinyl butyrate, etc.), polyvinyl ethers, including polyvinyl acetals, e. g., polyvinyl formal, polyvinyl butyral, etc.

Coating compositions may be prepared from the thermosetting or potentially thermosetting resinous compositions of this invention alone or admixed with, for example, melamine-formaldehyde resins, urea-formaldehyde resins, fatty oil or fatty oil-acid modified alkyd resins, or other film-forming materials commonly used in protective-coating or decorative-surfacing compositions.

Dyes, pigments, driers, curing agents, plasticizers, mold lubricants, opacifiers and various fillers (e. g., wood flour, glass fibers, asbestos, mineral wool, mica dust, powdered quartz, titanium dioxide, talc, china clay, carbon black, etc.) may be compounded by conventional practice with the resinous materials of this invention, including those compositions which comprise a soluble, polymerizable, partial condensation product of an aldehyde, e. g., formaldehyde, and a polymer of an unsaturated guanamine of the kind with which this invention is concerned, with or without one or more other materials which are co-reactive therewith, thereby to secure a coating, molding or other composition best adapted for a particular use.

The modified and unmodified synthetic materials, more particularly resinous compositions, of this invention have a wide variety of uses in addition to coating, molding and other applications. The soluble resins of my invention have a wide range of solubility in organic solvents, including alcohols, ketones, esters, aromatic hydrocarbons and mineral spirits, and in solution state can be used as laminating varnishes in the production of laminated articles wherein sheet materials, e. g., paper, cloth, sheet asbestos, glass cloth, etc., are coated or coated and impregnated with the resin solution, superimposed and thereafter united under heat and pressure. They also may be employed as an adhesive in making plywood, in electrical insulating and impregnating applications, for bonding together abrasive grains in the production of resin-bonded abrasive articles such, for instance, as grindstones, sandpapers, etc., in the manufacture of electrical resistors, etc. They also may be used for treating textile materials (e. g., cotton, linen, rayon and other cellulose-containing textiles, wool, silk or other natural or synthetic proteinaceous textiles, including nylon and textiles derived from soya beans, etc.), polyacrylonitrile fibers and textiles produced therefrom, in order to improve the properties of such textile materials and to make them more serviceable or useful.

By reason of the fact that the aldehydic reactant, e. g., formaldehyde, is reacted with a polymer of an unsaturated guanamine, higher-molecular-weight aldehyde-reaction products thereof can be produced (since the guanamine can be readily polymerized to yield a high-molecular-weight polymer) than if the aldehyde is reacted first with the unsaturated guanamine, followed by polymerization of the aldehyde-reaction product. As a result, the polymerizable compositions of this invention are particularly valuable in molding, coating and similar applications where high-molecular-weight bodies are especially useful.

I claim:

1. A polymerizable composition comprising a polymerizable product of reaction of ingredients comprising (1) a polymer of an amidogen compound represented by the general formula

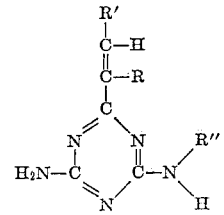

where R represents a member of the class consisting of hydrogen and the methyl radical, R' represents a member of the class consisting of hydrogen and the phenyl radical, and R'' represents a member of the class consisting of hydrogen and alkyl, aralkyl and aryl radicals, and (2) a substance which is reactive with the polymer of (1) and which is selected from the class consisting of (a) aldehydes, (b) reaction products of ingredients comprising an aldehyde and a carbon-containing amidogen compound and (c) mixtures of (a) and (b).

2. A composition as in claim 1 wherein the polymer of (1) is a homopolymer of the amidogen compound defined in (1) of that claim.

3. A composition as in claim 1 wherein the polymer of (1) is a polymer of acryloguanamine.

4. A composition as in claim 1 wherein the polymer of (1) is a polymer of methacryloguanamine.

5. A composition as in claim 1 wherein the polymer of (1) is a polymer of N-phenylmethacryloguanamine.

6. A composition as in claim 1 wherein the polymer of (1) is a copolymer of copolymerizable ingredients including (A) the amidogen compound defined in (1) of that claim and (B) a different compound which is copolymerizable therewith and which contains a $CH_2=C<$ grouping, the amidogen compound of (A) constituting from 1% to 99%, by weight, of the total of (A) and (B).

7. A composition as in claim 1 wherein the substance of (2) is formaldehyde.

8. A composition as in claim 1 wherein the substance of (2) is a reactive reaction product of ingredients comprising melamine and formaldehyde.

9. A composition as in claim 8 wherein the reactive reaction product of ingredients comprising melamine and formaldehyde is a reactive butylated melamine-formaldehyde reaction product.

10. A product comprising the polymerized composition of claim 1.

11. The method of preparing a new synthetic composition which comprises polymerizing a polymerizable composition comprising a polymerizable product of reaction of ingredients comprising (1) a polymer of an amidogen compound represented by the general formula

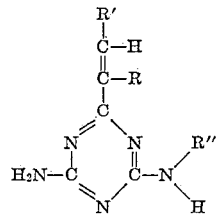

where R represents a member of the class consisting of hydrogen and the methyl radical, R' represents a member of the class consisting of hydrogen and the phenyl radical, and R" represents a member of the class consisting of hydrogen and alkyl, aralkyl and aryl radicals, and (2) a substance which is reactive with the polymer of (1) and which is selected from the class consisting of (a) aldehydes, (b) reaction products of ingredients comprising an aldehyde and a carbon-containing amidogen compound and (c) mixtures of (a) and (b).

12. A method as in claim 11 wherein the polymerizable composition therein defined is polymerized under heat.

13. A method as in claim 11 wherein the polymerizable composition therein defined is polymerized with the aid of a polymerization catalyst.

14. A method as in claim 11 wherein the polymerizable composition therein defined is polymerized under heat and with the aid of a polymerization catalyst.

References Cited in the file of this patent

UNITED STATES PATENTS

| Number | Name | Date |
|---|---|---|
| 2,309,624 | Bradley | Feb. 2, 1943 |
| 2,461,943 | Thurston | Feb. 15, 1949 |
| 2,496,097 | Kropa | Jan. 31, 1950 |
| 2,527,314 | Mackay | Oct. 24, 1950 |

FOREIGN PATENTS

| Number | Country | Date |
|---|---|---|
| 266,377 | Switzerland | Apr. 17, 1950 |
| 930,681 | France | Aug. 18, 1947 |